(12) United States Patent
Masuzawa et al.

(10) Patent No.: US 6,992,553 B2
(45) Date of Patent: Jan. 31, 2006

(54) MAGNETIC-FIELD MOLDING APPARATUS

(75) Inventors: Masahiro Masuzawa, Saitama-ken (JP); Keiko Kikuchi, Saitama-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 235 days.

(21) Appl. No.: 10/463,399

(22) Filed: Jun. 18, 2003

(65) Prior Publication Data

US 2005/0076973 A1      Apr. 14, 2005

(30) Foreign Application Priority Data

Jun. 18, 2002   (JP) .............................. 2002-177326
May 22, 2003   (JP) .............................. 2003-144243

(51) Int. Cl.
*H01F 13/00*      (2006.01)

(52) U.S. Cl. ..................................... 335/284
(58) Field of Classification Search ............... 310/156.43–156.47; 335/302–306
See application file for complete search history.

(56) References Cited

U.S. PATENT DOCUMENTS

| | | | | |
|---|---|---|---|---|
| 4,185,262 A | * | 1/1980 | Watanabe et al. | 335/302 |
| 4,547,758 A | * | 10/1985 | Shimizu et al. | 335/302 |
| 2003/0160674 A1 | * | 8/2003 | Komuro et al. | 335/302 |

FOREIGN PATENT DOCUMENTS

| | | |
|---|---|---|
| JP | 08-111968 | 4/1996 |
| JP | 2000-195714 | 7/2000 |
| JP | 2000-269062 | 9/2000 |
| JP | 2002-057018 | 2/2002 |

* cited by examiner

*Primary Examiner*—Ramon M. Barrera
(74) *Attorney, Agent, or Firm*—Sughrue Mion, PLLC

(57) ABSTRACT

A polar-anisotropic ring magnet having magnetization directions in alignment with its normal line at each magnetic pole position and in alignment with its tangential line at each middle position between adjacent magnetic poles, and having a substantially constant angle difference in a magnetization direction between adjacent elements, the elements being obtained by division at an equal angle pitch between the magnetic pole position and the middle position adjacent to the magnetic pole position.

2 Claims, 9 Drawing Sheets

Radial-Anisotropic

Polar-Anisotropic

MAGNETIC-FIELD MOLDING APPARATUS

FIELD OF THE INVENTION

The present invention relates to a polar-anisotropic ring magnet, and a method and an apparatus for producing it, particularly to a polar-anisotropic, sintered rare earth ring magnet generating substantially no cogging torque when installed in a motor, and a method and an apparatus for producing such a polar-anisotropic, sintered rare earth ring magnet.

BACKGROUND OF THE INVENTION

A radial-anisotropic magnet and a polar-anisotropic magnet shown in FIGS. 15(a) and 15(b) are known as magnets used in rotors, etc. of permanent magnet synchronous motors. Either magnet generates a cogging torque when installed in a motor. The cogging torque depends on the rectangularity of magnetic poles and an attraction force between magnetic poles. Because a larger cogging torque results in larger vibration and noise while a motor is rotating, it is desirable to reduce the cogging torque. Various attempts have been made to reduce the cogging torque; (a) contriving a stator tooth tip design, (b) providing a magnet with a magnetization waveform close to a sine wave, (c) optimizing the number of magnetic poles on both a stator and a rotor, (d) skewing or skew-magnetizing a rotor to provide it with magnetization averaged in a rotation axis direction, (e) widening gaps between magnetic poles, etc.

Among them, the means (b) of providing a magnet with a magnetization waveform close to a sine wave can reduce the cogging torque without decreasing its power. Because a magnetic flux between adjacent magnetic poles flows in an arcuate form in a polar-anisotropic ring magnet, a surface magnetic flux density distribution has a waveform close to a sine wave, so that a polar-anisotropic ring magnet is advantageous over a radial-anisotropic magnet having a surface magnetic flux density distribution in a rectangular waveform. In addition, because a polar-anisotropic ring magnet can have a surface magnetic flux density as high as about 1.5 times that of a radial-anisotropic ring magnet, higher power can be obtained by the polar-anisotropic ring magnet than by the radial-anisotropic magnet.

As an example of an apparatus for molding a polar-anisotropic ring magnet, JP 2000-269062 A discloses a molding apparatus used in a magnetic-field-molding step in the production of an anisotropic ring magnet having a plurality of poles on its surface by a sintering method, which comprises a cylindrical, nonmagnetic die and a columnar rod core for defining a ring-shaped, molding space, the molding die having n grooves to produce a magnet having n magnetic poles, a coil for applying a magnetic field being received in each groove, and high-magnetic-permeability members being buried between adjacent grooves of the die However, this molding apparatus fails to provide a polar-anisotropic ring magnet with a surface magnetic flux density distribution sufficiently close to a sine wave.

To make the surface magnetic flux density distribution of a polar-anisotropic ring magnet close to a sine wave, namely, to make it have a desired sine wave-matching rate, magnetic powder should be properly oriented in magnetic field molding. However, JP 2000-269062 A does not teach at all in which direction the magnetic powder should be oriented to make its surface magnetic flux density close to a sine wave. With such factors as sintering deformation, etc., the sine wave-matching rate of the surface magnetic flux density distribution is about 85 to 90% in mass-produced magnets.

OBJECTS OF THE INVENTION

Accordingly, an object of the present invention is to provide a polar-anisotropic ring magnet having a surface magnetic flux density distribution with a stably high sine wave-matching rate, which generates substantially no cogging torque when installed in a motor, and a method and an apparatus for producing such a polar-anisotropic ring magnet.

DISCLOSURE OF THE INVENTION

To produce a polar-anisotropic ring magnet having a surface magnetic flux density distribution with a high sine wave-matching rate, it is necessary to optimize the orientation direction of magnetic powder in magnetic field molding. Though the designs of magnetic-field-applying coils and molding dies have been devised to optimize the orientation direction of magnetic powder as taught by JP 2000-269062 A, for instance, no clear criterion for optimization has not been found, and their designing has actually been conducted on a try-and-error basis.

Recently, technologies for electromagnetic field analysis have been widely used for the designing of motors. Among them, a finite element method (FEM) is useful, because it provides a realistic solution by digitizing each mesh of a mesh-modeled object without using partial differential equations, etc. As far as the designing by FEM of ring magnets with respect to magnetization directions (orientation directions of magnetic powder for optimizing the magnetization directions) is concerned, however, there has been no clear criterion in polar-anisotropic ring magnets, though it is relatively easy in segment magnets and ring magnets having radial orientation.

In a polar-anisotropic ring magnet shown in FIG. 15(b), for instance, how magnetic powder should be oriented is not clear at all at a position 7 inside the magnetic pole and at a middle position 8 between adjacent magnetic poles on the periphery. It is thus not clear how magnetic powder should be oriented from an S pole to an N pole or from an N pole to an S pole in a polar-anisotropic ring magnet.

As a result of intense research in such a situation, the inventors have found, through the analysis of a distribution of a magnetic field generated by coils in a space in which a ring magnet is formed, that when the magnetization direction changes by an equal angle pitch between a magnetic pole position and its adjacent position, in other words, when the magnetization directions are the same on an arbitrary normal line regardless of radial positions, as shown in FIG. 3, the surface magnetic flux density distribution is in the form of a sine wave. The present invention has been completed based on this finding.

Thus, the polar-anisotropic ring magnet of the present invention has magnetization directions in alignment with its normal line at each magnetic pole position and in alignment with its tangential line at each middle position between adjacent magnetic poles, and has a substantially constant angle difference in a magnetization direction between adjacent elements, the elements being obtained by division at an equal angle pitch between the magnetic pole position and the middle position adjacent to the magnetic pole position.

The angle difference between an actual magnetization direction and a theoretical one in the element is preferably within 6% of a central angle between the magnetic poles.

The polar-anisotropic ring magnet preferably has a magnetization directions, which are substantially constant on its arbitrary normal line at any radial position.

The polar-anisotropic ring magnet preferably has an outer diameter Do, an inner diameter Di and the number of magnetic poles P, which meet a condition represented by the formula of $Di \geq Do(P-1.5\pi)/P$.

The measured waveform of the surface magnetic flux density distribution in a circumferential direction preferably has a matching rate of 93% or more to a sine wave having the same period and peak.

The method for producing a polar-anisotropic ring magnet of the present invention comprises applying a magnetic field in the molding of magnetic powder charged into a ring-shaped cavity, such that (a) the magnetic powder is oriented along a normal line at each magnetic pole position and along a tangential line at each middle position between adjacent magnetic poles, and that (b) when the polar-anisotropic ring magnet is divided to elements at an equal angle pitch between the magnetic pole position and the middle position adjacent to the magnetic pole position, an angle difference in a magnetization direction between adjacent elements is substantially constant.

The magnetic-field-molding apparatus of the present invention used in the production of the above polar-anisotropic ring magnet comprises a molding die having a circular cross-sectional bore; a columnar rod core concentrically disposed in the circular cross-sectional bore of the die to define a ring-shaped cavity; a plurality of recesses opening on the inner surface of the die; and a plurality of coils disposed in each recess, a plurality of coils being aligned along the cavity, and a ratio of a central angle $\theta_1$ defined by a plurality of coils aligned along the cavity in each recess to a central angle $\theta_2$ between coils in the adjacent recesses being 0.8 to 1.2. Such recess is preferably enlarged on the side facing the cavity.

In an example of the polar-anisotropic ring magnet partially shown in FIG. 3, (a) the magnetization direction is in alignment with a normal line at a magnetic pole position and completely opposite between the N pole and the S pole, while it is in a tangential direction at a middle position between the adjacent magnetic poles, as shown by arrows in a fan-shaped, broken line U, and (b) when a region between the magnetic pole position and the middle position is divided to elements at an equal angle pitch, there is a substantially constant angle difference in magnetization directions between adjacent elements, as shown by arrows in a fan-shaped, broken line $V_2$. The deviation of the actual magnetization direction from the theoretical magnetization direction in each element is preferably within 6% of the central angle between the magnetic poles.

The "theoretical magnetization direction" is defined as follows, referring to FIG. 3, which exemplifies that a region 17 (22.5°) from an S pole position 5 to a middle position 6 is equally divided to 5 elements in a polar-anisotropic ring magnet with eight magnetic poles. In each element $P_1$, $P_2$, $P_3$, $P_4$ shown by the lines pentasecting the region 17 in the broken line U next to the S pole 5, the magnetization direction changes successively at a constant angle difference from the S pole. Namely, the magnetization direction proportionally changes from the S pole 5 to the middle position 6. Thus, the magnetization (orientation) direction changes successively by an angle (13.5°) obtained by dividing an angle (-67.5° in this example) between the normal line at the S pole 5 and the tangential line at the middle position 6 by the number (5) of elements. In the example shown in FIG. 3, in which the magnetization direction $W_0$ at the N pole is 0°, and the number of elements is 10, the magnetization direction $W_1$ in an element adjacent to the N pole is theoretically -13.5°, and the magnetization direction $W_2$ in the next element is theoretically -27.0°.

There is ideally no difference between an actual magnetization direction and a theoretical one. For instance, because a central angle between adjacent magnetic poles is 45° in a polar-anisotropic ring magnet with eight magnetic poles, the permitted angle deviation of the actual magnetization direction from the theoretical one is 45°×0.06=2.7°. The actual magnetization direction $W_1$ may thus be in a range of -13.5°±2.7°, and the actual magnetization direction $W_2$ may be in a range of -27.0°±2.7°. Under these conditions, the sine wave-matching rate of the surface magnetic flux density distribution is 93% or more.

Further, the polar-anisotropic ring magnet of the present invention has a substantially constant orientation direction on an arbitrary normal line at any radial position, as shown in the broken lines $V_1$, $V_2$ in FIG. 3. In other words, because there are arcuate magnetic flux lines having the same curvature between the magnetic poles 11a and 11b in FIG. 15(b), they may be expressed substantially by one arcuate curve 9. In a polar-anisotropic ring magnet having a plurality of magnetic flux lines with different curvatures as shown by dotted lines in FIG. 16, however, its surface magnetic flux density distribution has a low sine wave-matching rate. Namely, a high sine wave-matching rate cannot be obtained, unless there is orientation along arcs of the same curvature between adjacent magnetic poles.

This condition should be met even in a thin, polar-anisotropic ring magnet. It has been found that even if a magnetic circuit between adjacent magnetic poles is not connected in a region including a center position 10 as shown in FIG. 5(b), that is, even if magnetic flux lines project inward from the inner surface of the ring magnet, a polar-anisotropic ring magnet can have an excellent sine wave-matching rate.

It is preferable that the intersection of a curve expressing magnetic flux lines and the middle position 10 between the adjacent magnetic poles is in contact with the inner surface of the ring magnet as shown in FIG. 5(a) or projects from the inner surface of the ring magnet as shown in FIG. 5(b). When the polar-anisotropic ring magnet is so thick as to have an inner surface as shown by the broken line in FIG. 5(a), its magnetic properties are hardly improved, simply resulting in increase in weight and cost. It is thus clear that the polar-anisotropic ring magnet having the inner surface as shown by the broken line is thicker by Wd than necessitated. The inner diameter Di of the polar-anisotropic ring magnet can be designed from the outer diameter Do and the number P of magnetic poles by the formula of $Di \geq Do(P-1.5\pi)/P$.

Reasons for this relation will be explained referring to FIG. 4. Analysis has indicated that when the ratio of the magnet thickness to the distance between magnetic poles exceeds a certain level, the saturation rate of a surface magnetic flux density, a relative value to the saturated magnetic flux density (100%), becomes substantially constant. In FIG. 4, the axis of abscissas shows a ratio (%) of a radial thickness of the ring magnet to a half interpolar distance (peripheral length from one magnetic pole to its adjacent middle position), and the axis of ordinates shows the saturation rate of the surface magnetic flux density (percentage to the maximum value), when the inner diameter Di changes with the outer diameter Do fixed. The thickness of the ring magnet is (outer diameter Do−inner diameter Di)/2, and the half interpolar distance is (outer diameter Do×π)/2 (number P of magnetic poles). It has been found that when the ratio of the thickness of the ring magnet to the half interpolar distance is 150% or more, the magnetic flux density is saturated. The peak magnetic flux density is saturated at the ratio of about 150% regardless of the outer diameter and the number of magnetic poles. Accordingly, what happens by making the polar-anisotropic ring magnet further thicker is only the addition of a useless portion on the inner side, failing to provide improved magnetic properties. This sets the threshold in the axis of abscissas at 150%, providing the formula (1) from 1.5> (thickness of ring magnet/half interpolar distance).

Because the orientation direction does not change depending on a radial position on a normal line, the sine wave-matching rate does not change, even if a polar-anisotropic ring magnet having a large ratio of the outer diameter to the inner diameter is produced and cut on its inner side to become a thin polar-anisotropic ring magnet. Making a polar-anisotropic ring magnet thin to meet the condition of $Di \geq Do(P-1.5\pi)/P$ makes it particularly suitable for applications such as disc motors needing light weight and high speed.

Though the orientation direction is measured by a vibrating sample magnetometer utilizing a magnetic Karr effect in the present invention, it may be measured by the observation of magnetic domain structures by X-ray diffraction, Karr effect, etc., reflection electron diffraction, Rutherford backscattering, etc.

With respect to compositions for providing the polar-anisotropic ring magnet of the present invention, $R_2T_{14}B$-based magnets (R represents rear earth elements and T represents transition elements) such as NdFeB, etc., $RCo_5$— or $R_2Co_{17}$-based magnets such as SmCo, etc., $R_2T_{17}N$— or $RT_{12}N$-based magnets such as SmFeN, etc. may be used, and $R_2T_{14}B$-based sintered magnets are particularly preferable, though magnets having other compositions may also be used.

DESCRIPTION OF THE PREFERRED EMBODIMENTS

Figure 2:
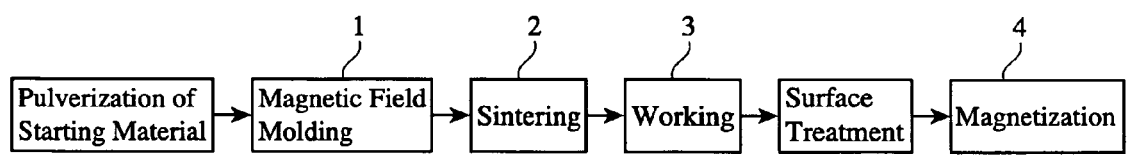
FIG. 2 is a diagram schematically showing the steps of producing a polar-anisotropic ring magnet.

FIG. 2 schematically shows the production steps of a polar-anisotropic, sintered rare earth ring magnet. Though a magnetization pattern in a sintered magnet is generally determined by a magnetic-field-molding step 1, in which magnetic powder is molded with orientation, a sintering step 2, a working step 3 and a magnetization step 4, the orientation of magnetic powder in the magnetic-field-molding step 1 is extremely important for a polar-anisotropic ring magnet, because it is difficult to reorient magnetic powder in the magnetization step 4.

The magnetic powder may be, for instance, $Nd_2Fe_{14}B$-based magnetic powder. Other rare earth elements such as Dy, etc. may be added to Nd, Co may be added to Fe, and metalloid elements other than B may be added to B. The particle size distribution of the magnetic powder is preferably adjusted to about 3 μm to 10 μm.

Figure 1:
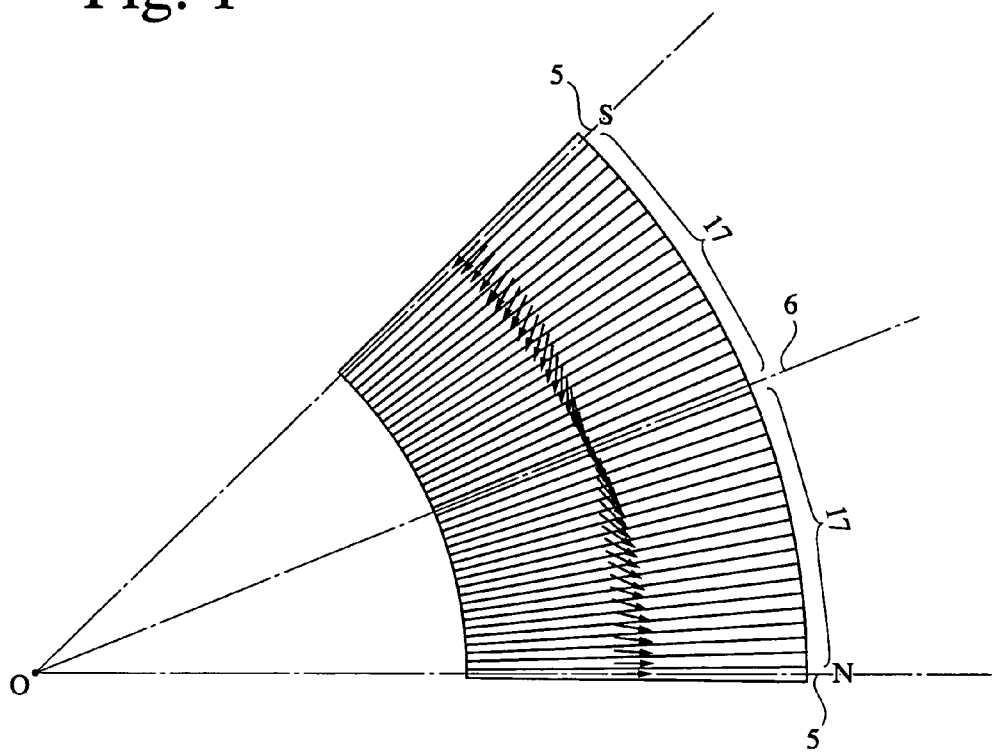
FIG. 1 is a schematic view showing magnetization directions in the polar-anisotropic ring magnet of the present invention.

FIG. 1 shows magnetization directions, with which a surface magnetic flux density distribution is in alignment with a sine wave, in a region from an S pole to an N pole in a polar-anisotropic ring magnet with eight magnetic poles. The direction of easy magnetization (orientation direction) is in a radial direction (normal line direction) at S and N pole positions 5, though opposite to each other. On the other hand, the orientation direction is perpendicular to the normal line, namely in alignment with a tangential line, at a middle position 6 between the S pole and the N pole (middle position between the magnetic poles). Though the magnetization direction can easily be set at these positions 5, 6, how it is set in regions 17, 17 between them is important. The inventors' analysis has revealed that the magnetization directions in each region 17, 17 can be set by dividing the region between the magnetic poles 5, 6 to elements at an equal angle pitch, and successively increasing or decreasing the magnetization direction in each element by an equal angle.

Figure 8:
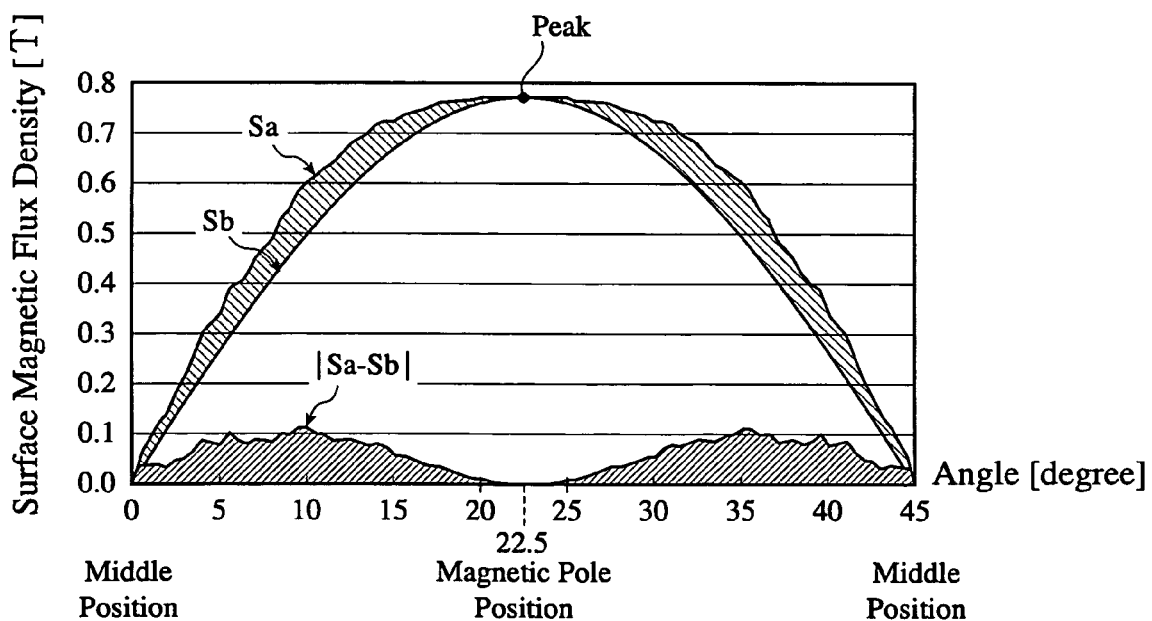
FIG. 8 is a graph for explaining a sine wave-matching rate of a surface magnetic flux density distribution.

To achieve a sine wave-matching rate of 93% or more in a surface magnetic flux density distribution, an angle difference between the actual magnetization direction and the theoretical one is preferably 6% or less of the central angle between magnetic poles. The angle difference is preferably 3% or less, more preferably 2% or less to achieve a sine wave-matching rate of 98% or more. As shown in FIG. 8, the sine wave-matching rate of the surface magnetic flux density distribution is determined by comparing the measured waveform of the surface magnetic flux density distribution with a sine wave having the same period and peak. Specifically, the sine wave-matching rate is determined by (1−A)×100, wherein A is a quotient obtained by dividing |Sa-Sb| by Sb, Sa being an area of a half-wave region of the measured waveform, and Sb being an area of a half-wave region of the sine wave.

Figure 3:
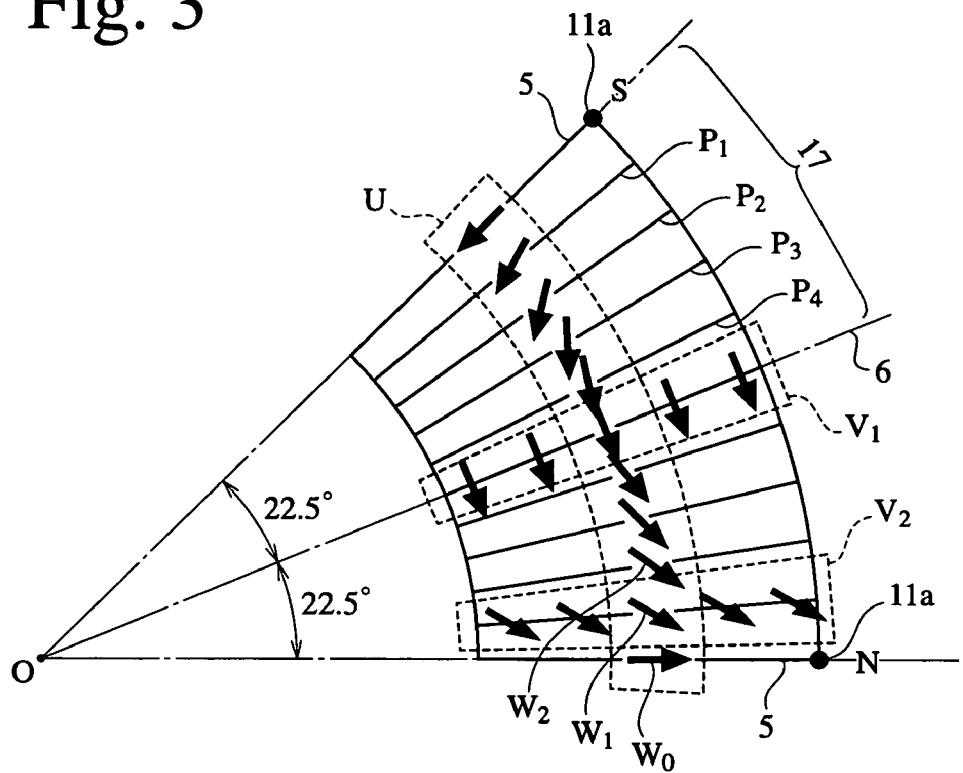
FIG. 3 is a schematic view showing orientation directions in the polar-anisotropic ring magnet of the present invention.
Figure 4:
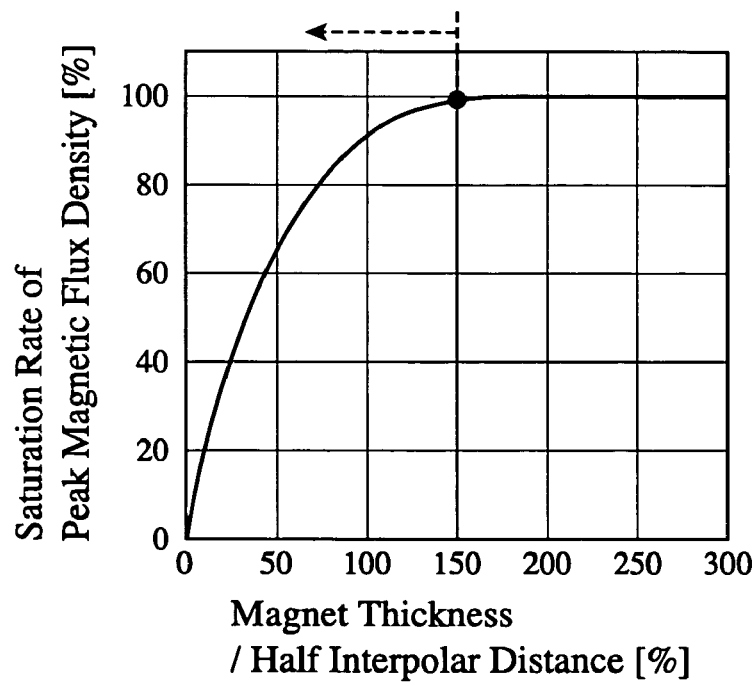
FIG. 4 is a graph showing the relation between a ratio of a ring magnet thickness to a half interpolar distance and a saturation rate of a surface magnetic flux density.

With respect to the radial direction, as shown by broken lines $V_1$, $V_2$ in FIG. 3, it is preferable that the magnetization directions are substantially the same regardless of radial positions. Though it is ideal that the actual magnetization direction is the same as the theoretical one at any radial position, the acceptable angle difference therebetween is within ±2.5° to obtain the sine wave-matching rate of 93% or more, preferably within ±1°. The sine wave-matching rate of 95% or more can be realized with the angle difference of within ±0.5°.

Figure 7:
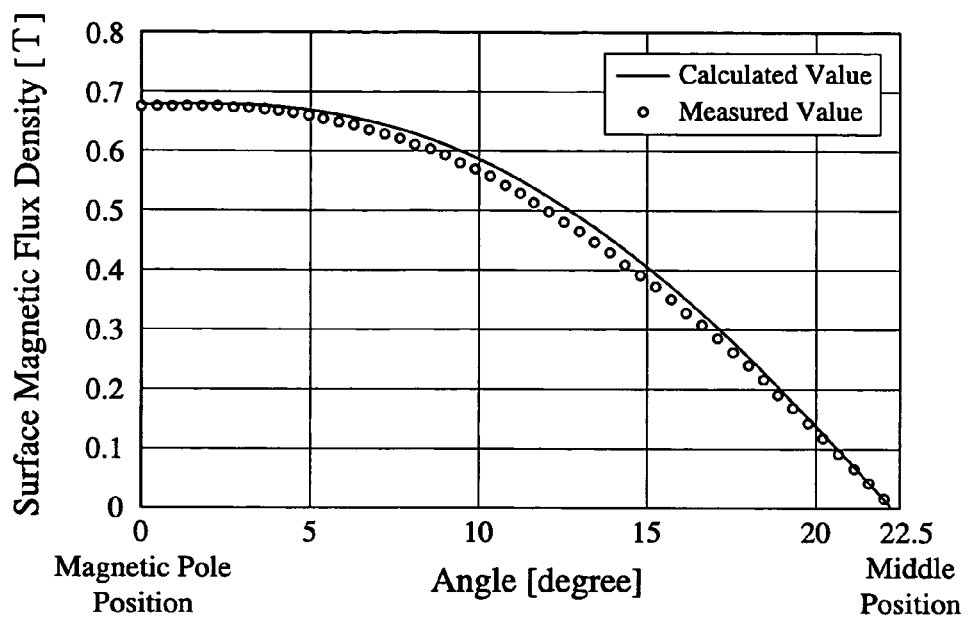
FIG. 7 is a graph showing the calculated value and measured value of a surface magnetic flux density distribution in a magnetization direction in the polar-anisotropic ring magnet of Example 1.
Figure 9:
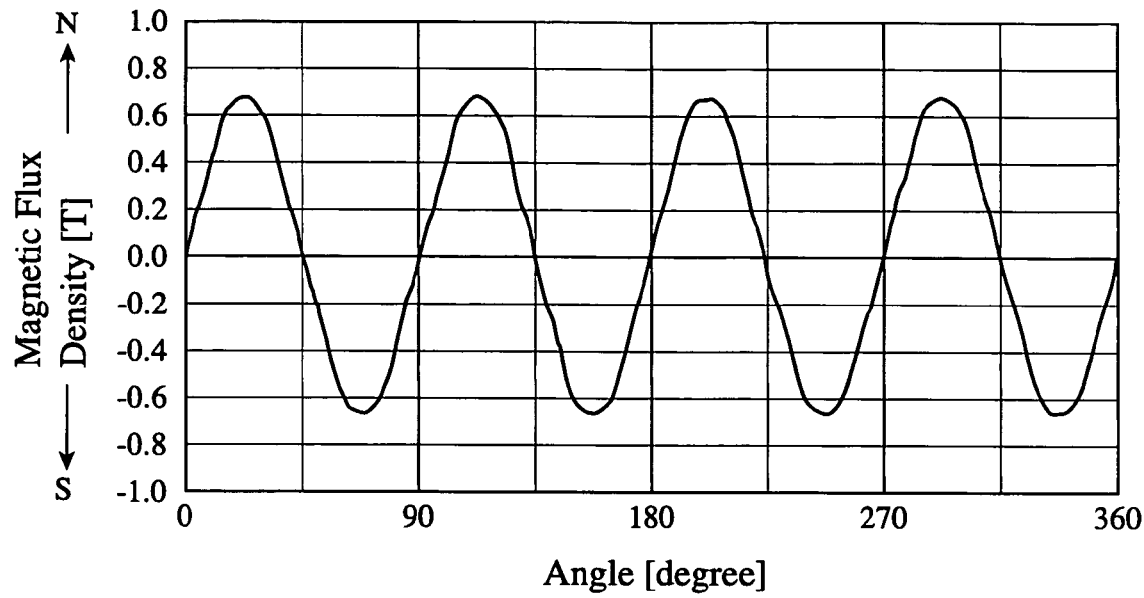
FIG. 9 is a graph showing the measurement results of a surface magnetic flux density distribution in the polar-anisotropic ring magnet of the present invention.

FIG. 7 shows the relation between the calculated surface magnetic flux density distribution and the measured one in the polar-anisotropic ring magnet of Example 1. It is clear from FIG. 7 that they are in good agreement with each other. FIG. 9 shows the measurement results of the surface magnetic flux density distribution in an entire circumference of an actual, polar-anisotropic ring magnet. Because the magnetization directions on a normal line are the same regardless of radial positions, analysis may be conducted on the assumption that the magnetic field is applied to a center portion of the ring magnet in a thickness direction.

It has been found that the structure of a magnetic-field-molding die is important to produce a polar-anisotropic ring magnet having magnetization directions, or orientation directions, meeting the requirements of the present invention. This is clear from the comparison of magnetic-field-molding dies shown in FIGS. 17(*a*) to 17(*c*).

Figure 17A:
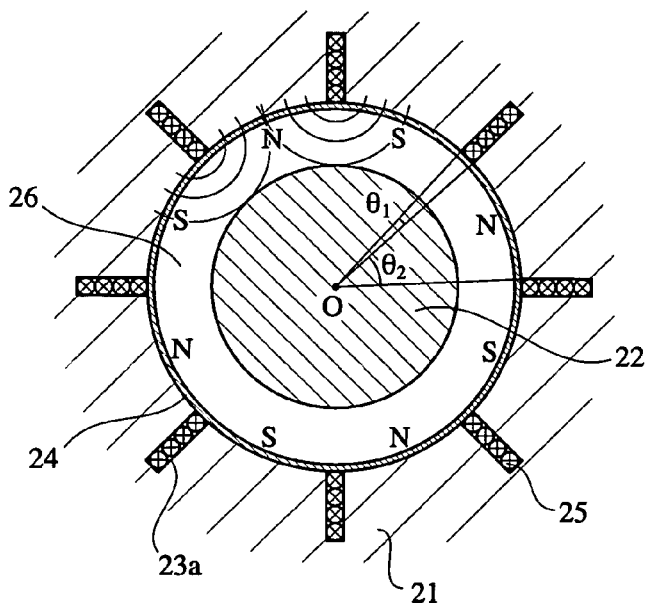
FIG. 17(a) is a cross-sectional view showing one example of a magnetic-field-molding die for a conventional polar-anisotropic ring magnet.
Figure 17B:
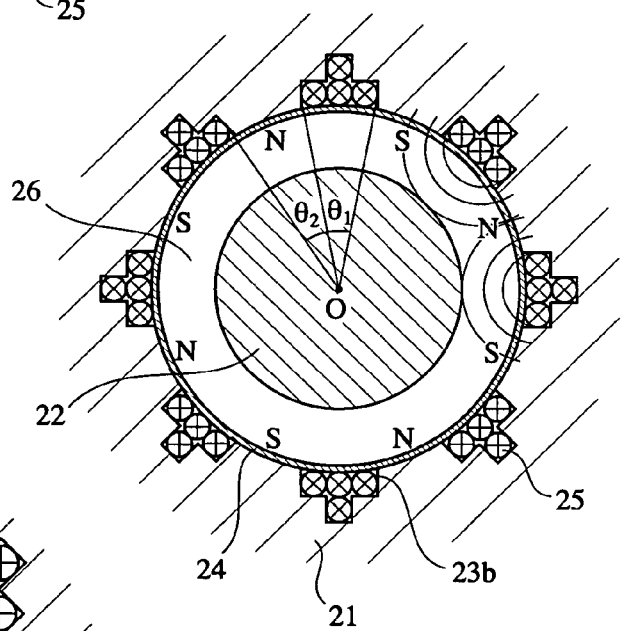
FIG. 17(b) is a cross-sectional view showing one example of a magnetic-field-molding die for the polar-anisotropic ring magnet of the present invention.
Figure 17C:
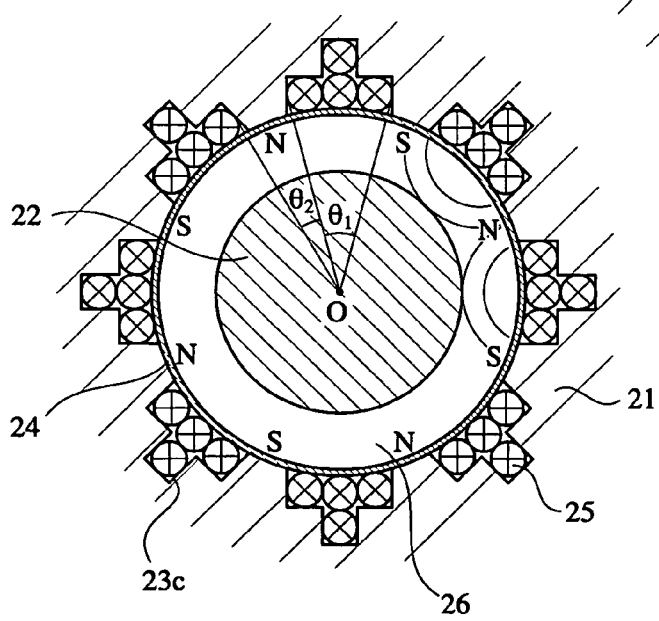
FIG. 17(c) is a cross-sectional view showing one example of a magnetic-field-molding die for a polar-anisotropic ring magnet in Comparative Example.

The magnetic-field-molding die having a structure shown in FIG. 17(*a*), which has conventionally been used, comprises a molding die 21 made of a magnetic material having a circular cross-sectional bore, a columnar rod core 22 concentrically disposed in the circular cross-sectional bore of the molding die 21, a plurality of slit-shaped recesses 23 opening on the inner surface of the molding die 21, and a nonmagnetic sleeve 24 disposed on the inner surface of the molding die 21 such that it covers the recesses 23. A plurality of coils 25 are received in each recess 23. The coils 25 are connected in series to generate polarity shown in the figure. A central angle $\theta_2$ between the coils 25 in adjacent recesses 23 is sufficiently larger than a central angle $\theta_1$ defined by the coils 25 in each recess 23. In such case, magnetic fields generated by the coils 25 in each recess 23 are substantially concentric, but magnetization directions in a cavity 26 of the molding die 21 do not meet the requirement of the present invention because of little overlap of adjacent magnetic fields with opposite polarities. The polar-anisotropic ring magnet formed by the magnetic-field-molding die shown in FIG. 17(*a*) generally has a surface magnetic flux density distribution, whose sine wave-matching rate is about 85 to 90%.

The magnetic-field-molding die having a structure shown in FIG. 17(*b*) is suitable for molding the polar-anisotropic ring magnet of the present invention. This magnetic-field-molding die is characterized in that each recess 23 is expanded on the side of a cavity 26, such that a plurality of coils 25 are aligned along the surface of the cavity 26; and that a central angle $\theta_1$ defined by a plurality of coils 25 in each recess 23 is substantially equal to a central angle $\theta_2$ between the coils 25 in adjacent recesses 23. Magnetic field analysis has revealed that in a case where $\theta_1$ is nearly equal to $\theta_2$, substantially concentric magnetic fields generated by a plurality of coils 25 in one recess 23 overlap substantially concentric magnetic fields with opposite polarity generated by a plurality of coils 25 in the adjacent recess 23, so that N and S poles are formed alternately with a substantially circular magnetic field between the magnetic poles. Thus, when a region between a magnetic pole position and a middle position adjacent thereto is divided to elements at an equal angle pitch, an angle difference in magnetization directions between adjacent elements is substantially constant. The polar-anisotropic ring magnet having such magnetization directions has a surface magnetic flux density distribution with an extremely high sine wave-matching rate.

In order that an angle difference between an actual magnetization direction and a theoretical one in each element is 6% or less of a central angle between magnetic poles, namely in order that a sine wave-matching rate is 93% or more, a ratio of the central angle $\theta_1$ to the central angle $\theta_2$ is preferably 0.8 to 1.2. The ratio of the central angle $\theta_1$ to the central angle $\theta_2$ is preferably 0.9 to 1.1, more preferably 0.95 to 1.05.

To meet the above condition concerning the ratio of the central angle $\theta_1$ to the central angle $\theta_2$ in polar-anisotropic ring magnets with 8 to 16 magnetic poles, which are particularly in great demand, the number of coils 25 disposed along an inner surface of the cavity in each recess 23 is preferably 2 to 10, more preferably 3 to 8. When the above number of coils 25 is 1, the outer diameter of each coil 25 is too large to efficiently generate a magnetic field in the cavity 26. On the other hand, when the above number of coils 25 exceeds 10, connections between the coils 25 are too complicated, and wires constituting the coils 25 have too small a diameter, failing to withstand a high-power pulse.

As shown in FIG. 17(*c*), when each recess 23 is so enlarged that a central angle $\theta_1$ defined by a plurality of coils 25 disposed along an inner surface of a cavity in each recess 23 is extremely larger than a central angle $\theta_2$ between coils 25 in adjacent recesses 23, the resultant polar-anisotropic ring magnet does not have magnetization directions meeting the requirements of the present invention, resulting in extreme decrease in the sine wave-matching rate of the surface magnetic flux density distribution.

The polar-anisotropic ring magnet obtained through a magnetic-field-molding step has a sintering shrinkage ratio differing by nearly 10% between an easy magnetization direction at a magnetic pole position and a direction perpendicular thereto at a middle position between magnetic poles. The polar-anisotropic ring magnet is thus dented in magnetic pole portions and bulged in middle portions between magnetic poles, needing cutting after sintering, and failing to keep a molding orientation at a magnetizing step. It is thus preferable to control orientation in magnetic field molding, taking into account the degree of deformation of the polar-anisotropic ring magnet determined by its size, material and degree of magnetization, etc.

The present invention will be described in detail referring to Examples below without intention of restricting it thereto.

EXAMPLE 1

A polar-anisotropic ring magnet with 8 magnetic poles of 32 mm in outer diameter, 24 mm in inner diameter and 25 mm in length was produced by the following process. First, a rare earth magnet alloy comprising 20.0% by mass of Nd, 8.5% by mass of Pr, 4.5% by mass of Dy, 1.0% by mass of B, 2.0% by mass of Co, 0.1% by mass of Ga, and 0.15% by mass of Cu, the balance being Fe, was embrittled by a hydrogen absorption method, and then coarsely pulverized and classified with a 32-mesh sieve to obtain a coarse powder having a particle size of 500 µm or less. 200 kg of the coarse powder was mixed with 0.02% by mass of a paraffin wax in a V-type mixer to obtain a coarse starting material powder. The coarse starting material powder was pulverized by a jet mill in a nitrogen gas stream having an oxygen concentration of 0.001% by volume, with its average particle size measured every 30 minutes, to obtain a molding powder having an average particle size of 5.0 µm or less.

Using a magnetic-field-molding die with $\theta_1$ nearly equal to $\theta_2$ shown in FIG. 17(b), molding was carried out in an Ar gas atmosphere while applying a magnetic field determined by taking empirically known sintering deformation into consideration, such that an angle deviation of an actual magnetization direction from the theoretical one was kept within ±0.5°.

Figure 6:
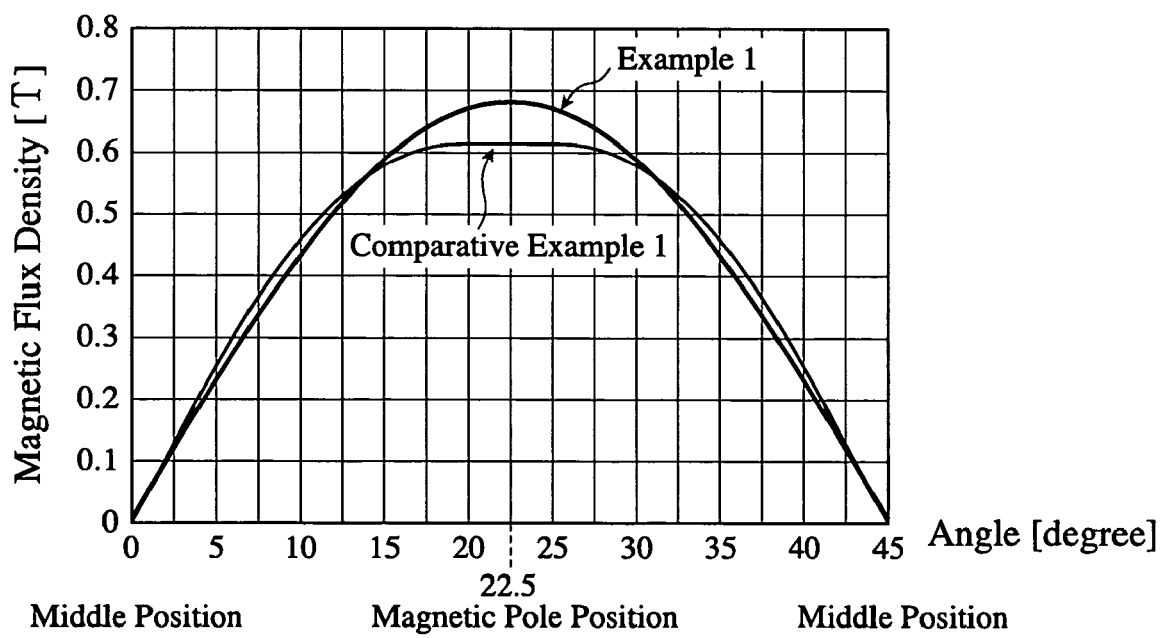
FIG. 6 is a graph showing magnetization waveforms measured in Example and Comparative Example.

The resultant green body was sintered at 1,080° C. in vacuum at $4 \times 10^{-4}$ Torr for 2 hours. The resultant sintered body was heat-treated in an Ar gas atmosphere at 900° C. for 2 hours and then at 550° C. for 1 hour. The resultant polar-anisotropic ring magnet was measured with respect to a surface magnetic flux density distribution after working and magnetizing, and the measured waveform of the surface magnetic flux density distribution is shown in FIG. 6. As is clear from FIG. 6, a sine wave-matching rate was about 98% in this Example.

COMPARATIVE EXAMPLE 1

A polar-anisotropic ring magnet with 8 poles was produced under the same conditions as in Example 1 except that an angle difference between the actual magnetization direction and the theoretical one exceeded ±2.7°, and measured with respect to a waveform of a surface magnetic flux density distribution. The measured waveform in Comparative Example 1 is shown in FIG. 6. A sine wave-matching rate was about 90% in Comparative Example 1.

EXAMPLE 2

Figure 10:
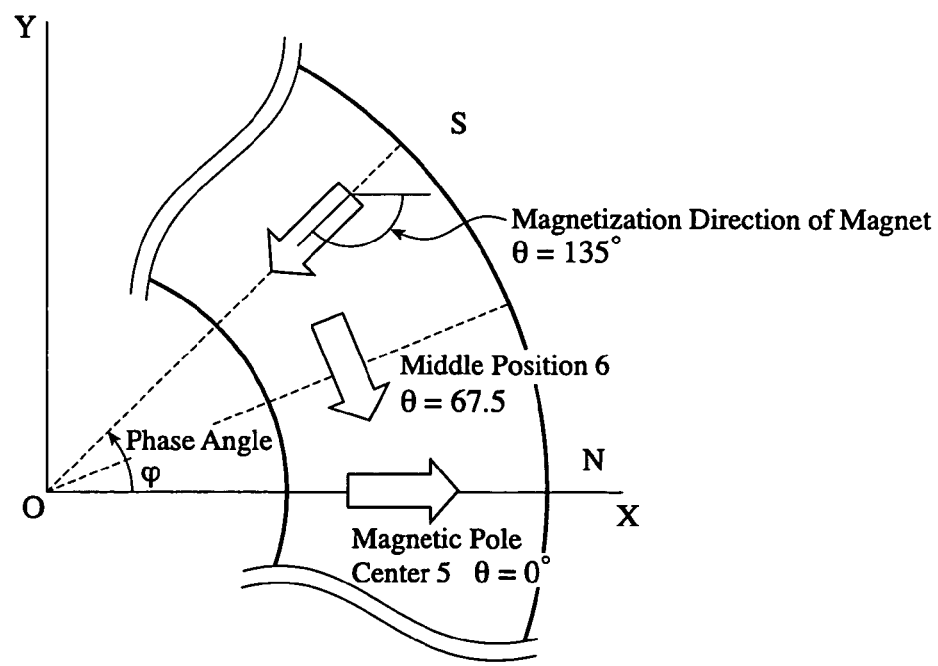
FIG. 10 is a view showing the definition of a magnetization direction and a phase angle.

A polar-anisotropic ring magnet with 8 poles was investigated with respect to a magnetization direction at an arbitrary phase angle by a magnetic field analysis. The coordinates of an analysis model are shown in FIG. 10. As shown in FIG. 10, a phase angle $\phi$ and a magnetization direction $\theta$ at an arbitrary position are expressed as angles from the X-axis in the analysis model. In the polar-anisotropic ring magnet with 8 poles, a magnetization direction at an N pole center 5 is along the X-axis, i.e., $\theta=0°$. A magnetization direction at a middle position 6 ($\phi=22.5°$) between N and S poles is perpendicular to the radial direction, i.e., $\theta=67.5°$.

Figure 11A:
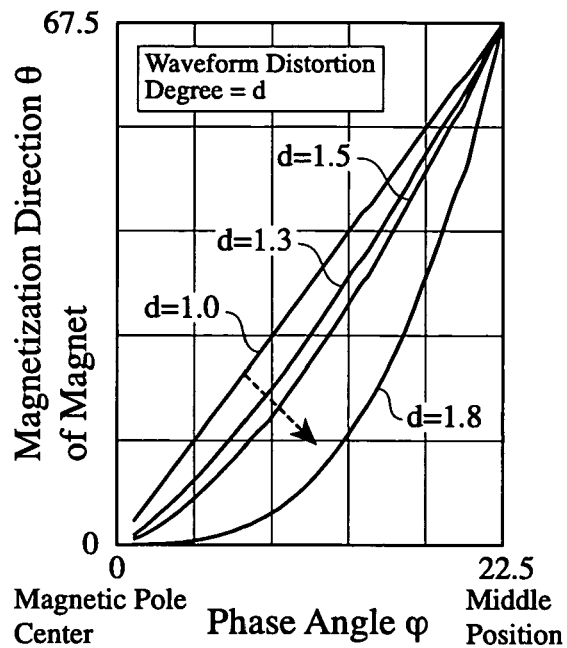
FIG. 11(a) is a graph showing the relation between a magnetization direction and a phase angle.

As shown in FIG. 11(a), in a case where the magnetization direction $\theta$ increases or decreases by an equal angle as the phase angle $\phi$ changes from the magnetic pole center (phase angle $\phi$=magnetization direction, $\theta=0°$) to the middle position between the magnetic poles ($\phi=22.5°$, $\theta=67.5°$) at an equal pitch, the magnetization direction $\theta$ is expressed by a straight line (linear function) with a waveform distortion degree d of 1.0. On the other hand, in a case where the magnetization direction changes slowly at the magnetic pole center and rapidly at the middle position between the magnetic poles, like a radial-anisotropic magnet, the magnetization direction $\theta$ is approximated by a curve with a waveform distortion degree d of 1.8 (high-degree function). The larger the waveform distortion degree d, the steeper the change of the magnetization direction at the middle position.

To investigate the waveform of a surface magnetic flux density in detail, the inventors analyzed what degree of function (distortion degree d) of the phase angle $\phi$ can approximate the magnetization direction shown in FIG. 11(a).

Figure 11B:
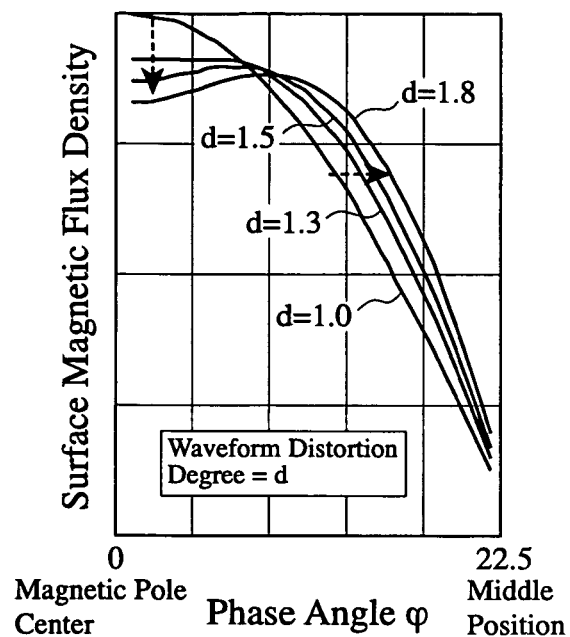
FIG. 11(b) is a graph showing the relation between a phase angle and a surface magnetic flux density.

As a result of an electromagnetic field analysis of the surface magnetic flux density waveform, it was found that when the magnetization direction $\theta$ increased or decreased by an equal angle (d=1.0), as shown in FIG. 11(b), the surface magnetic flux density distribution was extremely close to a sine wave. The larger the distortion degree d, the lower the peak of the surface magnetic flux density, resulting in a square waveform like the curve of d=1.8.

The magnetic field analysis results at waveform distortion degrees d of 1.3 and 1.5, respectively, are also shown in FIGS. 11(a) and 11(b). It was found that the distortion degree d was 1.0 in ideal polar-anisotropic ring magnets, and about 2 or more in ideal radial-anisotropic magnets.

Figure 12:
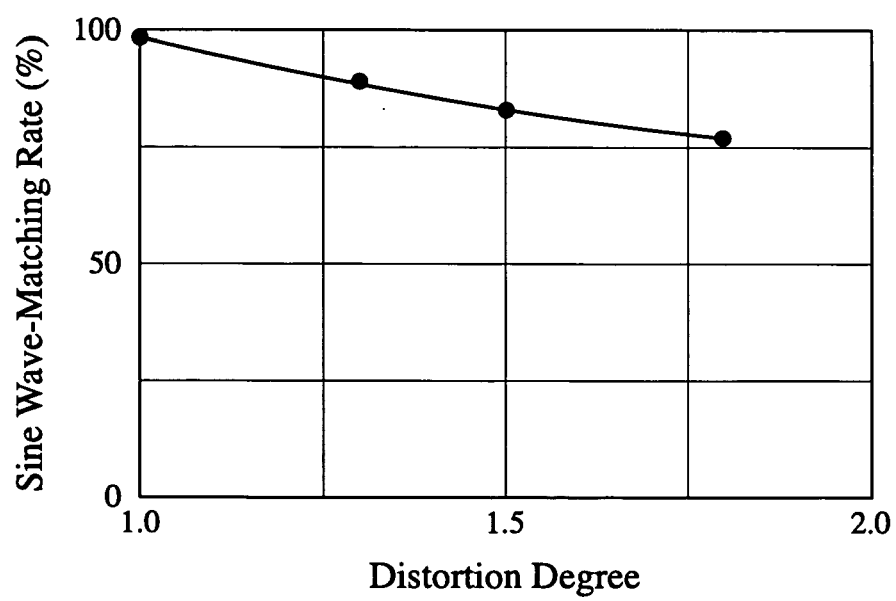
FIG. 12 is a graph showing the relation between a distortion degree and a sine wave-matching rate of a surface magnetic flux density distribution.

FIG. 12 shows the relation between the above two indexes (distortion degree d convenient for the magnetic field analysis, and easily measurable sine wave-matching rate) for exhibiting the waveform of the surface magnetic flux density of the polar-anisotropic ring magnet. Because of production problems such as sintering deformation, etc., conventionally mass-produced polar-anisotropic ring magnets had surface magnetic flux densities with distortion degrees of about 1.3 to 1.5 and sine wave-matching rates of about 82 to 89%.

Figure 13:
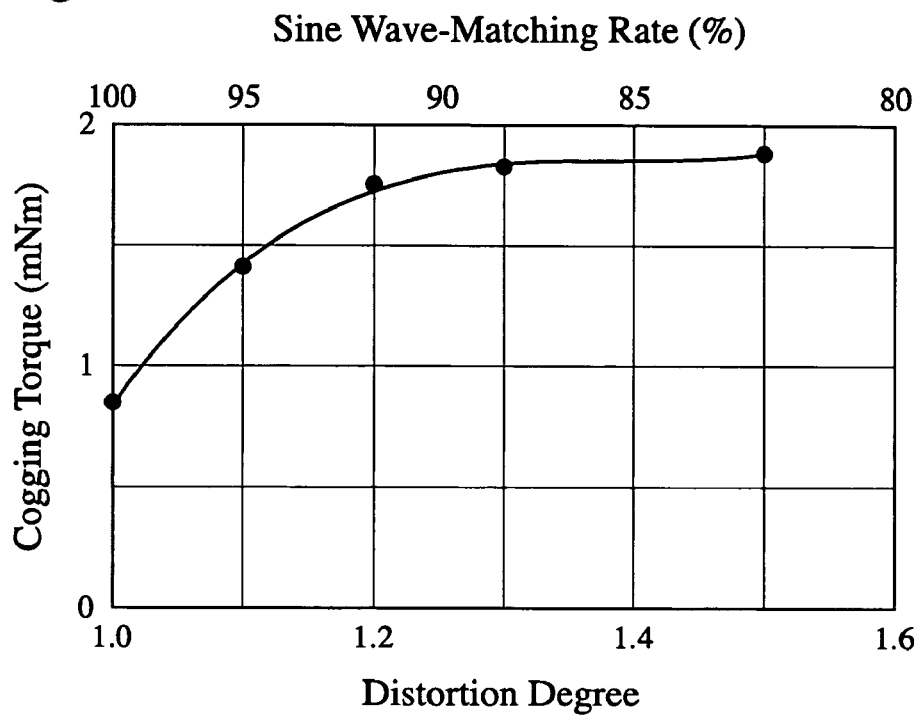
FIG. 13 is a graph showing the relation between a distortion degree and a cogging torque.

An analysis of the relation between the waveform of the surface magnetic flux density and the cogging torque revealed that the cogging torque remarkably decreased at a distortion degree of 1.2 or less as shown in FIG. 13. At this time, the sine wave-matching rate was 93% or more.

EXAMPLE 3

Figure 5A:
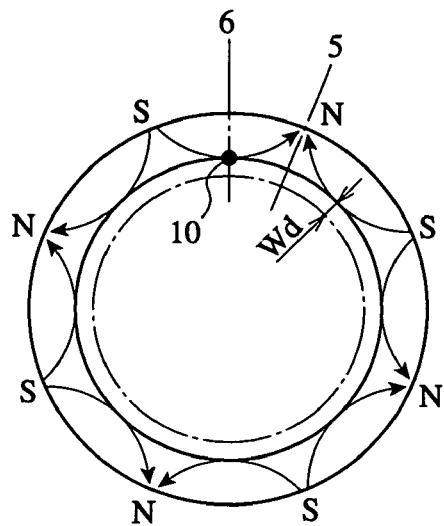
FIG. 5(a) is a schematic view showing the relation between magnetic flux lines and a thickness in one example of the polar-anisotropic ring magnet.
Figure 5B:
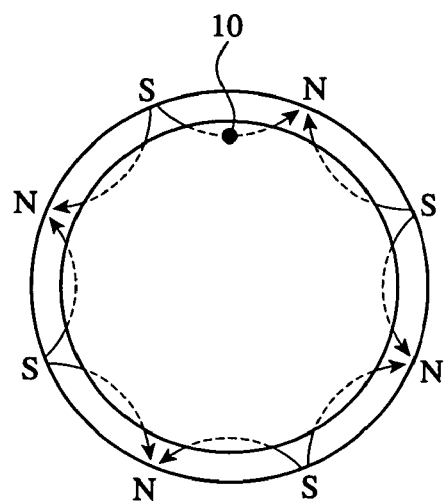
FIG. 5(b) is a schematic view showing the relation between magnetic flux lines and a thickness in another example of the polar-anisotropic ring magnet.
Figure 14:
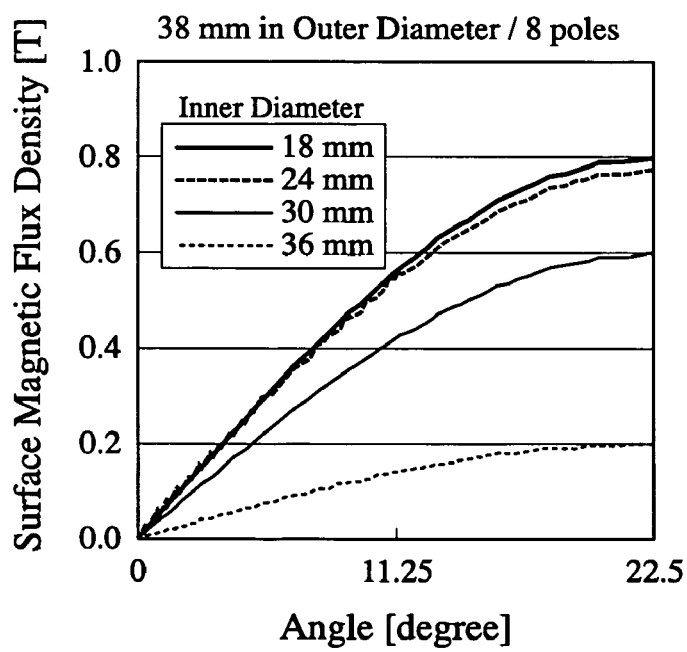
FIG. 14 is a graph showing the relation between a magnetic pole angle and a surface magnetic flux density in polar-anisotropic ring magnets having various thicknesses.
Figure 15A:
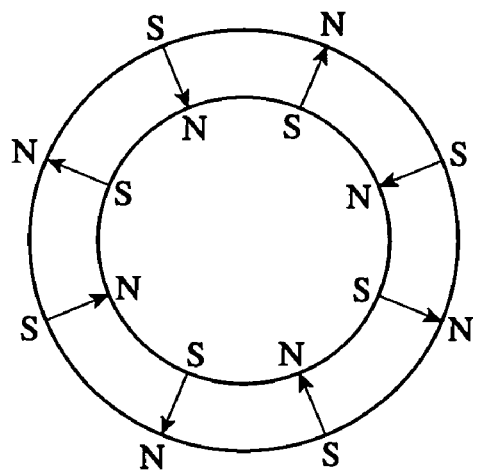
FIG. 15(a) is a schematic view showing magnetization directions in a radial-anisotropic ring magnet.
Figure 15B:
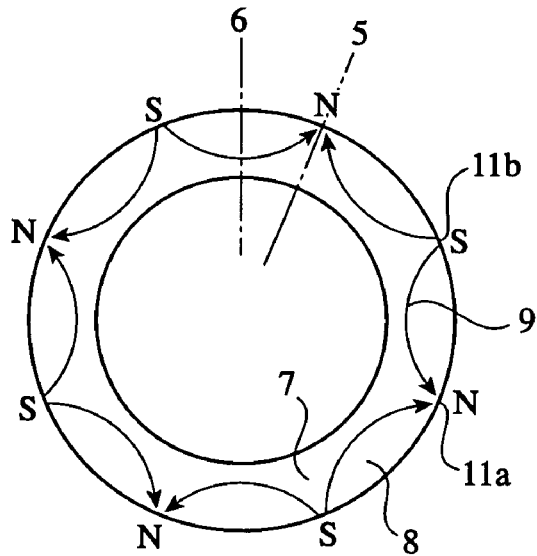
FIG. 15(b) is a schematic view showing magnetization directions in a polar-anisotropic ring magnet.
Figure 16:
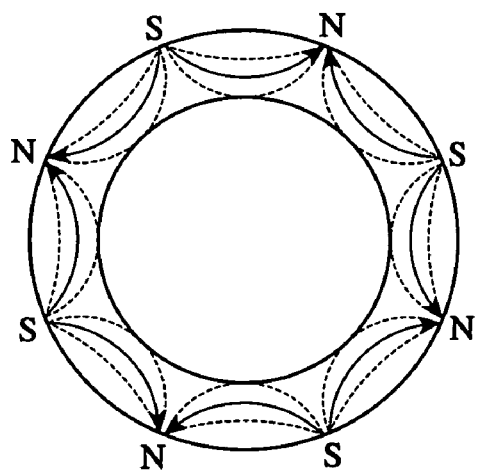
FIG. 16 is a schematic view showing one example of magnetization directions in a polar-anisotropic ring magnet.

As a result of investigation of the relation between the thickness and the surface magnetic flux density distribution of the polar-anisotropic ring magnet, it was found that the surface magnetic flux density decreased as the thickness decreased, as shown in FIG. 14. It was confirmed, however, that the sine wave-matching rate did not change even though the thickness decreased. For example, despite the fact that the polar-anisotropic ring magnet shown in FIG. 5(a) has a high surface magnetic flux density, and that the polar-anisotropic ring magnet shown in FIG. 5(b) has a low surface magnetic flux density, there is no difference in a sine wave-matching rate therebetween.

Even a thick polar-anisotropic ring magnet having an outer diameter of 38 mm and an inner diameter of 15 mm or less has the same surface magnetic flux density as that of a polar-anisotropic ring magnet having the same outer diameter and an inner diameter of 18 mm. It was thus confirmed that the inner surface portion shown as width W in FIG. 5(*a*) had substantially no contribution to improvement in the magnetic properties of the polar-anisotropic ring magnet. Accordingly, the polar-anisotropic ring magnet is preferably in a shape having substantially no width portion W.

Though the polar-anisotropic ring magnet with 8 magnetic poles has been explained in Examples above, the present invention is not limited thereto and applicable to any polar-anisotropic ring magnets with 4 magnetic poles or more. The present invention is suitable for producing high-quality, polar-anisotropic ring magnets with 8 to 16 magnetic poles, which are particularly in great demand.

As described above in detail, the present invention makes it possible to orient magnetic powder in magnetic field molding, such that the surface magnetic flux density distribution of a polar-anisotropic ring magnet matches a sine wave. Because the thickness of conventional ring magnets was empirically determined, there was no means for finding whether or not the ring magnets were unnecessarily thick. On the contrary, the present invention makes it possible to design a polar-anisotropic ring magnet with thickness having no useless portion for generating a surface magnetic flux density, thereby advantageously reducing weight and cost, and thus leading to lightweight motors with extremely smaller cogging torque than those of conventional motors. Further, the present invention can provide extremely thin, polar-anisotropic ring magnets having a high sine wave-matching rate, which are suitable for high-speed motors for hard disk drives, etc.

What is claimed is:

1. A magnetic-field-molding apparatus used for producing a polar-anisotropic ring magnet having magnetization directions in alignment with its normal line at each magnetic pole position and in alignment with its tangential line at each middle position between adjacent magnetic poles, and having a substantially constant angle difference in a magnetization direction between adjacent elements, said elements being obtained by division at an equal angle pitch between said magnetic pole position and said middle position adjacent to said magnetic pole position, said apparatus comprising a molding die having a circular cross-sectional bore; a columnar rod core concentrically disposed in the circular cross-sectional bore of said die to define a ring-shaped cavity; a plurality of recesses opening on the inner surface of said die; and a plurality of coils disposed in each recess, a plurality of coils being aligned along said cavity, and a ratio of a central angle $\theta_1$ defined by a plurality of coils aligned along said cavity in each recess to a central angle $\theta_2$ between coils in the adjacent recesses being 0.8 to 1.2.

2. The magnetic-field-molding apparatus according to claim 1, wherein said recess is enlarged on the side facing the cavity.

* * * * *